United States Patent [19]

Blauert et al.

[11] 3,887,824

[45] June 3, 1975

[54] COMMUNICATION MONITORING CIRCUIT

[75] Inventors: Hans Joachim Blauert; Filip Jejina; Hans Reisch, all of Munich, Germany

[73] Assignee: Siemens Aktiengesellschaft, Berlin & Munich, Germany

[22] Filed: Jan. 5, 1973

[21] Appl. No.: 321,272

[30] Foreign Application Priority Data

Jan. 24, 1972 Germany ............................ 2203180

[52] U.S. Cl. .............. 307/294; 178/69 G; 307/246; 307/247 R; 328/131

[51] Int. Cl. ......................... H03k 17/26; H04l 25/02

[58] Field of Search ........ 307/246, 247 R, 293, 294; 328/129–131; 178/69 R, 69 G

[56] References Cited

UNITED STATES PATENTS

| | | | |
|---|---|---|---|
| 2,949,547 | 8/1960 | Zimmerman | 307/293 |
| 3,069,552 | 12/1962 | Thomson | 307/293 |
| 3,275,850 | 9/1966 | Arseneau | 307/293 |
| 3,317,668 | 5/1967 | Johnson | 178/69 G |
| 3,354,323 | 11/1967 | Douaihy | 307/293 |
| 3,414,735 | 12/1968 | Harris et al. | 328/129 |
| 3,573,564 | 4/1971 | Blauert | 307/293 |
| 3,668,314 | 6/1972 | Rousseau | 178/69 G |

*Primary Examiner*—Stanley D. Miller, Jr.

[57] ABSTRACT

A circuit for monitoring transmission paths in telecommunication systems having a timing circuit connectable to the transmission line over an input circuit is described. The timing circuit includes a parallel combination of resistance and capacitance, and a transistor switching stage controls the charging of the capacitor, over which a switching element, such as a relay, is controlled. The input circuit includes a threshold connected circuit over a contact of the switching element. The threshold circuit is a bistable circuit having an adjustable switching point which is connectable to the timing circuit resistance through a transistor. The latter transistor is operable to couple an input to the timing circuit only upon an exceeding of a preset value of the threshold circuit.

3 Claims, 1 Drawing Figure

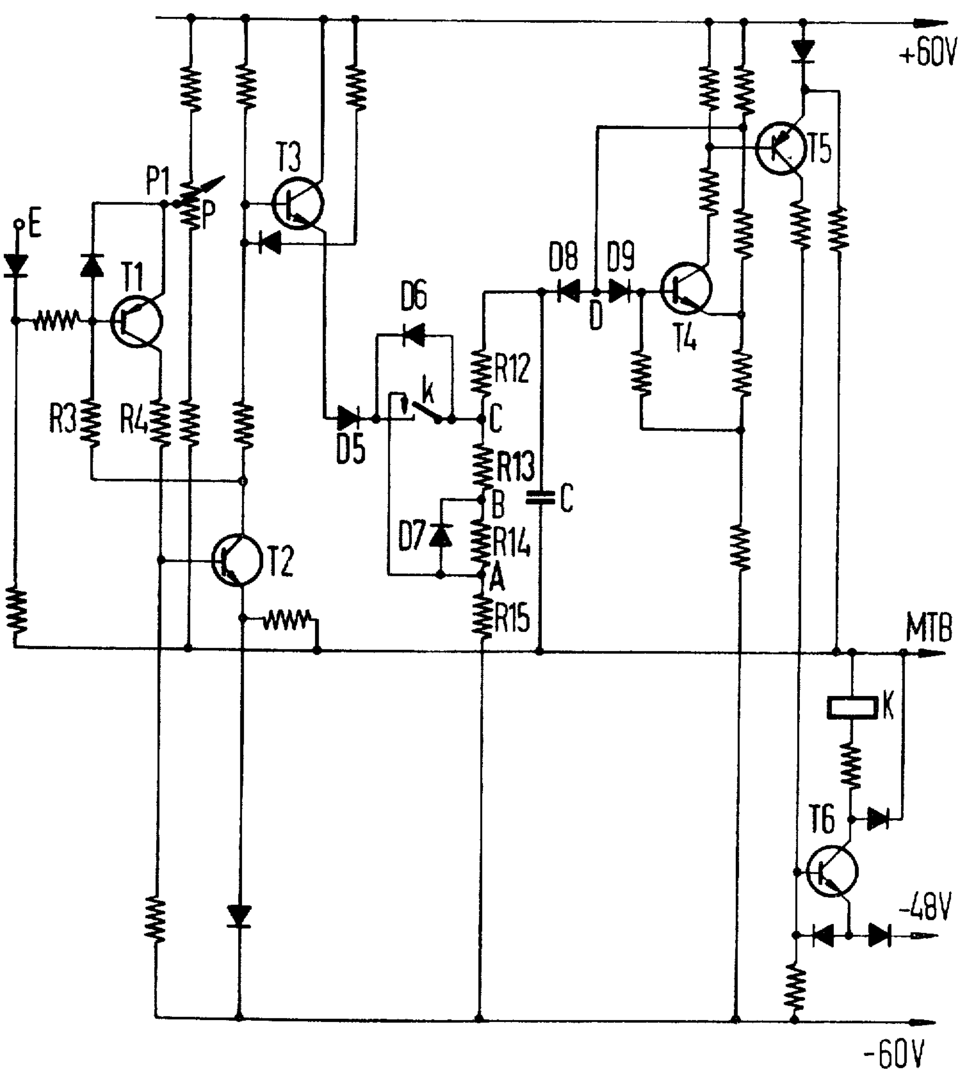
+60V
P1
P
E
T1
T3
R3
R4
T2
D6
k
D5
C
R12
R13
B
D7
R14
A
R15
C
D8
D9
D
T4
T5
MTB
K
T6
-48V
-60V

COMMUNICATION MONITORING CIRCUIT

BACKGROUND OF THE INVENTION:

This invention relates to a communication monitoring circuit for the trunks of telegraph switching systems in which a timing circuit is connectable to the transmission line over an input circuit.

The prior art discloses circuits for controlling time-dependent relays, wherein the timing circuit capacitor is completely decoupled from the transistor stage that weights the charge transfer thereto during the conductive, as well as during the inhibited state of the transistors in the transistor stage. These circuits have the advantage that the time-determining elements of the timing circuit are completely unaffected by the changes in the weighting portion of the arrangement, which might be influenced by temperature changes or tolerances of the various components.

To utilize the advantages of the aforementioned prior art circuit in monitoring line circuits, a circuit has been proposed having the distinguishing feature that the timing circuit does not directly receive the signals appearing on a line. According to this proposal, an input circuit is provided between a terminal of the line to be monitored and the input of the timing circuit, which includes a threshold that weights the current carried on the line and circuits that can be switched if the threshold value is exceeded. The input circuit can be connected to the input of the timing circuit over a contact of the weighting element. The input circuit comprises various resistors over which, depending on the position of the contact of the weighting element, discharging and charging circuits for the timing circuit capacitor are formed. In this way it is possible to match the operating and releasing delay of the weighting element to the various ambient conditions of the telegraph switching arrangement.

However, when the telegraphic speed is increased, a series of demands occur which cannot be satisfied with the proposed circuit. These requirements are essentially caused by the fact that the introduction of higher telegraphic speeds require the use of electronic relays known as electronic telegraphic signal transformers, instead of the usual telegraph relays. Since the electronic relays can only be loaded with a continuous short-circuit current of about 300 mA, the use of correspondingly dimensioned protective resistors is necessary. This has as a consequence that, for example, if there if ground connection at the subscriber end, a greater reduced voltage is applied to the input of the communication monitoring circuit, because of the voltage drop at these protective resistors. Another characteristic of electronic signal trnasformers is that if the control current fails, by way of example in the case of a line break, the two output paths of the electronic signal transformer become highly resistive, so that a third state is assumed. In this case, only a very low voltage is available at the output of the electronic telegraph signal transformer. In switching systems operating at comparatively high telegraphic speeds and wherein, therefore, this type of electronic telegraphic signal transformer is used, a communication monitoring circuit must not only ensure a reliable recognition of the call signal, but it must also recognize without fail a ground connection at the subscriber end, as well as a line break.

The invention has as an object the provision of a communication monitoring circuit which meets the above requirements.

SUMMARY OF THE INVENTION

This and other objects are achieved by the invention, because the threshold circuit used is a bistable circuit having an adjustable switching point. The bistable circuit can be connected to the series resistor connection of the timing circuit over a following transistor switch which is connected through only if an input signal occurs exceeding the threshold value, and over a contact of the weighting element to form various charging and discharging circuits for the timing circuit capacitor. The transistor switch is connected to a first divider point situated between a third and fourth resistor if the contact is not actuated, and to a third divider point of the resistor series connection located between a second and first resistor, if the contact is actuated. The third resistor of the resistor series connection disposed between the second and fourth resistor is bridged by a diode, poled in the direction of the discharging current, and the contact is bridged by a diode, poled in the direction of the charging current. In this way, if the contact of the switching element is not actuated, a discharging circuit is obtained for the timing circuit capacitor using the first two resistors and a charging circuit using the first and last resistor. If the contact is operated, a discharging circuit is available using the first resistor, and a charging circuit is completed over the entire series resistor connection.

The resistors of the series resistor connection in the communication monitor in accordance with the invention are dimensioned such that if the contact of the weighting element is not operated, the resistors in the discharging circuit and in the charging circuit each have such a total resistance value that the discharging time constant has a much greater value than the charging time constant. If the contact is operated, the resistors in the discharging circuit or the charging circuit each have such a total resistance value such that the charging time constant has a much greater value than the discharging time constant. This has the advantage that in each case the two recharging time constants are very small. The switching point of the existing bistable circuit according to the invention in the input circuit can advantageously be adjusted by a potentiometer. This has the advantage that the response threshold voltage can be adjusted sufficiently accurately according to the required conditions and can be checked at any time.

BRIEF DESCRIPTION OF THE DRAWING

The principles of the invention will be more readily understood by reference to a detailed description, given below, of a preferred embodiment constructed according to those principles. The described preferred embodiment is illustrated in the single FIGURE of the drawing which is a schematic diagram of a monitoring circuit using a relay as the weighting circuit.

DETAILED DESCRIPTION OF THE DRAWING

A bistable circuit is shown in the drawing which comprises two transistors T1 and T2 and the resistors R3 and R4. The switching point can be adjusted using potentiometer P at connection point P1. The transistor T3 is controlled by the output of the bistable circuit, this output being taken from across a resistor in the collector circuit of transistor T2.

Transistor T3 functions as a switch, and is connected by its emitter through contact *k* of a relay K to individual voltage divider points A, B and C of a series resistor connection for a timing circuit comprising the resistors R12, R13, R14. A diode bridging contact *k* is labeled D6; a diode connected to the divider point B between the third and fourth resistor and bridging the third resistor is labeled D7. The timing circuit capacitor determining the operating and opening times of the weighting relay together with the resistors of the resistor series connection is labeled C.

To weight the charge transfer of the timing circuit capacitor, a circuit is used, for example, as fully described in U.S. Pat. No. 3,573,564. The weighting relay K is connected to the collector of a transistor T6, which is controllable over the output of the transistor stage. This has the advantage that the telegraph battery is discharged to achieve a favorable relationship to the protective release current.

To describe the operation of the described preferred embodiment one starts from the assumption that a voltage is applied to the input E of the communication monitoring circuit which is negative with respect to the effective voltage set at point P1. This is, for example, the case if a start polarity is transmitted on the circuit to be monitored, corresponding to the quiescent condition. In this case, the transistors T1 and T2 are conductive, and the transistor T3 is in the inhibited state. During this time, the timing circuit capacitor C is charged almost to the voltage of −60V.

If the voltage applied to the input E exceeds the threshold value set at point P1, the transistors T1 and T2 of the switching circuit are rendered nonconductive, which results in the transistor T3 becoming conductive. In this case, there is a discharging circuit for the timing circuit capacitor, which is connected through the resistors R12, R13, the diodes D7 and D5, and the conductive transistor T3. Thus, the discharging time constant is in this case determined by the resistors R12 and R13. When a specific effective voltage is attained at point D, the conduction of the two diodes D8 and D9 are reversed. The result is that the transistors T4, T5 and T6 become conductive. Thus, the exciting circuit for the weighting relay K is switched on, and the relay K operates. in the event that the voltage applied to the input E again drops below the threshold value set at point P1, before this state is attained, a charging circuit for the timing circuit capacitor C is completed with the resistor R15, the diode D6 and the resistor R12. The time constant determined by these two resistors is considerably smaller than the discharging time constant, so that only a very small recharge time constant is obtained.

With the closing of the weighting relay K, the contact *k* thereof is actuated. A circuit is available for the charging of the timing circuit capacitor over the resistor R12 and the actuated contact *k*, as well as over the diode D5 and the still conductive transistor T3. The time constant for this charging process is determined by the value of the first resistor R12 only. Now, if the voltage applied to the input E falls below the threshold value set at point P1, the transistors T1 and T2 of the bistable circuit become conductive, and the transistor T3 is blocked. The renewed discharging of the timing circuit capacitor C which in the meantime has fully been charged to +60 V, takes place over the total resistor series connection R12, R13, R14 and R15. The time constant for this charge transfer is caused to lag the release signal in switching centers, so that a release signal will be recognized without fail, because of the drop-out of the weighting relay K.

However, if the drop below the effective voltage applied at the input E is not a release signal, but, for example, a series of start polarity pulses within a test to be transmitted, immediately after completion of the negative input signal, i.e., after completion of a start pulse excitation, a discharging circuit is again available over transistor T3, diode D5, the still actuated contact *k* and resistor R12. Since the aforesaid time constant for this process is only determined by the resistor R12, a very small recharge time constant is available for this case also. Thus, it is ensured that the defined initial conditions are again present for a genuine release signal transmitted afterwards. Only after the development of the loading time constant determined by the total resistance value of the series resistor connection does the effective voltage at point D attain such a value that the conduction of the diodes D8 and D9 is again blocked, so that the transistors T4, T5 and T6 are again inhibited, and the weighting relay K drops out. The opening of the contact *k* of the weighting relay K again produces the initial conditions described hereinabove.

Since in the input circuit according to the invention the transistor T3, connected in a specific way over the bistable circuit for the selection of the timing circuit, takes over the task of the electronic telegraphic signal transformer provided for circuits of known construction, the communication monitoring circuit according to the invention is capable of performing the tasks required in transmissions at comparatively high telegraphic speeds.

The description of a preferred embodiment set forth hereinabove is considered to be only exemplary of the principles of the invention and is not to be considered limiting. The described embodiment may be changed or modified and still be within the scope of the invention, as defined by the appended claims.

We claim:

1. A transmission line monitoring circuit for a telecommunication network for operating a time-dependent switching element upon the occurrence of predetermined conditions, comprising:

input circuit means for coupling the current from a transmission line in said network to said monitoring circuit including a bistable circuit connected to said transmission line and adjustable to operate at a predetermined threshold value of current on said transmission line and switching means controlled by said bistable circuit, timing circuit means comprising parallel combination of a series connection of resistances and capacitance and a switching stage for determining the state of charge of said capacitance and means coupling said switching element to said switching stage so as to be energized by said switching stage, said switching element including contact means, said contact means being arranged between said switching means and said timing circuit means for controlling the charging and discharging times of said capacitance through said series connection of resistances in dependence on the operating state of said switching element by connecting said switching means during a first operating state of said contact means to a first junction point in said series connection of resistances and during a second operating state of said contact means to a second junction point in said series connection of resistances.

2. The monitoring circuit defined in claim 1 wherein said connecting means is connected to said resistance, upon said contact means assuming a first operating state, such that the discharging time constant of said capacitance is greater than the charging time constant thereof, and wherein said connecting means is connected to said resistance upon said contact means assuming a second operating state, such that the charging time constant of said capacitance is greater than the discharging time constant thereof.

3. The monitoring circuit defined in claim 1 wherein said bistable circuit includes a potentiometer for adjusting said threshold value.

* * * * *